Figure 1:
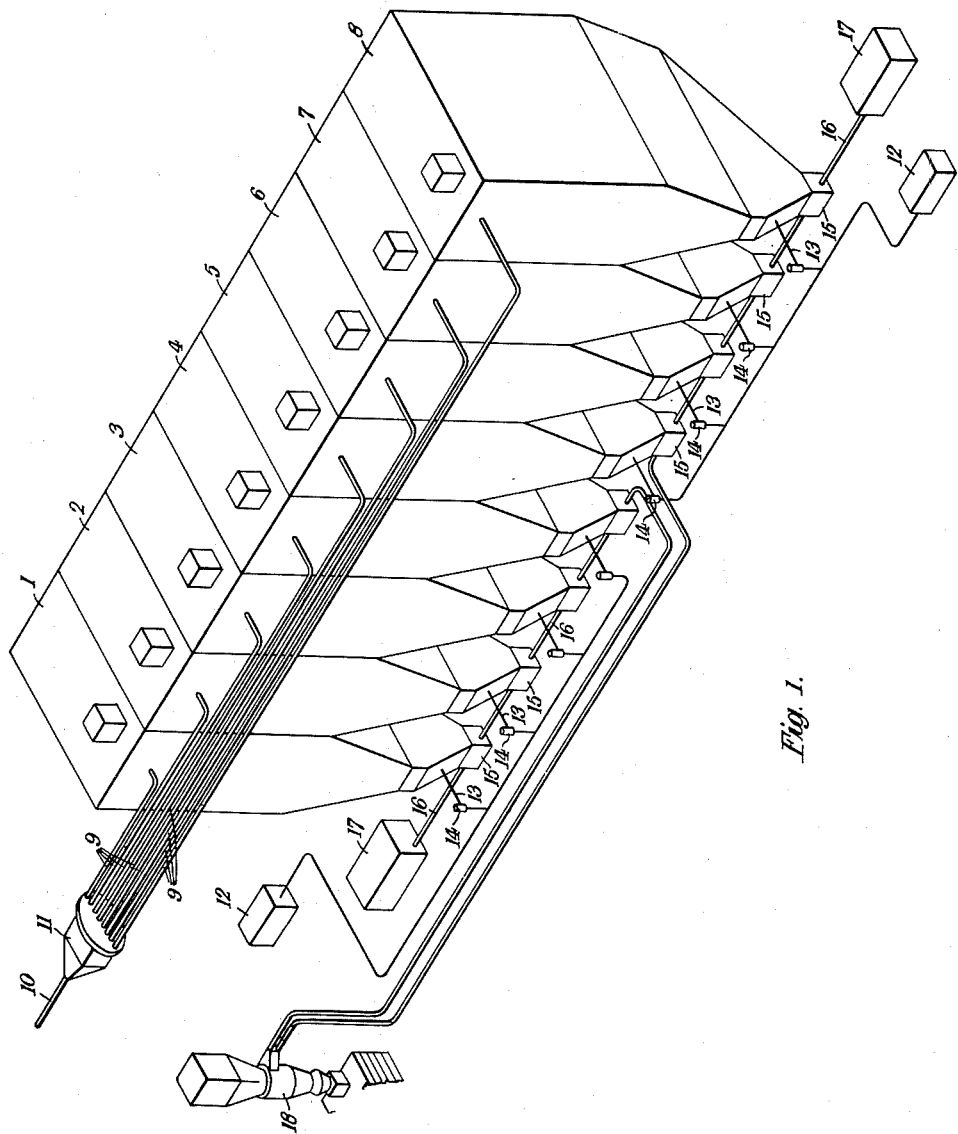

May 16, 1961 M. McKINLAY McCULLOCH 2,984,521
METHOD AND APPARATUS FOR BLENDING FLOUR
OR OTHER PULVERULENT MATERIAL
Filed June 9, 1959 2 Sheets-Sheet 2

INVENTOR
Murdoch McKinlay
McCulloch

By Watson, Cole, Grindle & Watson
ATTORNEYS

United States Patent Office 2,984,521
Patented May 16, 1961

2,984,521
METHOD AND APPARATUS FOR BLENDING FLOUR OR OTHER PULVERULENT MATERIAL

Murdoch McKinlay McCulloch, Peterborough, England, assignor to Baker Perkins Limited, Peterborough, England, a British company Filed June 9, 1959, Ser. No. 819,073
Claims priority, application Great Britain June 16, 1958
3 Claims. (Cl. 302—28)

This invention is concerned with the blending of different grades of flour contained in individual storage hoppers or silos.

One known method of blending is to feed the flour from the bottom of each silo by a constant speed rotary feeder and an individual pneumatic line, through which air is blown at high speed, e.g. 60 m.p.h., to a multi-pocket blender having level detectors in each pocket for effecting on-off control of the associated constant speed rotary feeder, the proportioning of the different grades of flour in the mixture being determined by the adjustment of gate valves at the bases of the pockets in the blender. This method has the disadvantage that the variations in head of flour in the pockets causes inconsistent feed rates.

In another known method of blending, flour is delivered simultaneously to a weigher from a number of silos provided with variable speed rotary feeders by a fluidised conveyor common to all the silos, said conveyor including a downwardly inclined tunnel containing a porous medium supporting the flour and beneath and through which flows a stream of air. This method has the disadvantage that extra head-room is required because of the inclined tunnel. Also the rate of flow of flour through the tunnel is slow and it is necessary to back-set the weigher to allow for the weight of flour contained in the tunnel after the rotary feeders of the silos have been stopped.

The invention provides a method of blending different grades of pre-fluidised flour or other pulverulent material contained in silos each having a fluidised base, which comprises delivering the flour from the lower ends of the silos simultaneously by variable speed rotary feeders to a common horizontal, or substantially horizontal, discharge pipe through which is blown a blast of air at high speed. When this method is adopted, blending of the different grades of flour occurs in the pipe, and the mixture may be discharged directly from the pipe into a service bin, having an air outlet at its upper end. Alternatively the mixture may be discharged from the pipe into a cyclone blender.

The invention includes apparatus for blending different grades of flour or the like, comprising a number of silos each having a variable speed rotary feeder at its lower end and a fluidised base for facilitating the flow of the flour to the rotary feeder, a common horizontal or substantially horizontal discharge pipe for receiving the discharge from the rotary feeders of all the silos and a blower for blowing a current of air through the discharge pipe at high speed, e.g. 60 m.p.h.

The rotary feeders are preferably of the usual pocket wheel type and the apparatus provides for efficient blending of the flour supplied in series from the silos to the common outlet pipe with a minimum of head-room.

I find that, at present, flour cannot be effectively discharged in series by rotary pocket wheels from more than four silos in series, owing to the difficulty of obtaining a sufficiently effective seal on the rotary feeders to maintain the air pressure in the discharge pipe. It is seldom required to utilise more than four grades of flour in any one blend. If, however, it is desired to deliver flour from more than four silos, this can be done by dividing the silos into groups, each having a common delivery pipe, and conducting the flour in parallel streams through the pipes to a common service bin or cyclone blender.

It will be appreciated that the feeders of any of the silos can be stopped at any time when not required for use.

They can be set to run at a predetermined speed when a constant blend is required. When the blend is to be varied the speed of the feeders can be adjusted either manually, remotely from a control panel or automatically, e.g. under punched card control.

Figure 2:
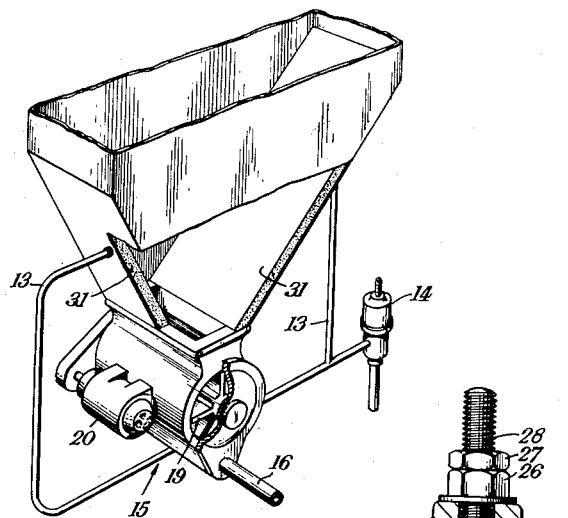
Figure 3:
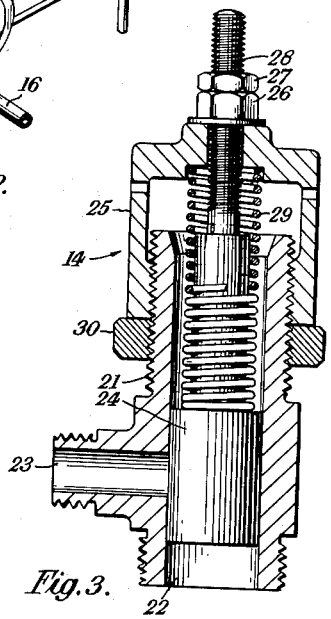

A typical installation according to the invention will now be described in more detail, by way of example, with reference to the accompanying drawings in which:

Fig. 1 is a diagrammatic perspective view of a battery of silos and associated loading and discharge mechanism,
Fig. 2 is a view showing in more detail the bottom portion of one of the silos, and
Fig. 3 is a sectional view of a resistance valve.

The installation shown in Fig. 1 includes a bank of eight silos 1–8, to the upper ends of which flour can be delivered by pneumatic supply lines 9 connected to a common supply line 10 by an eight way valve 11. Each silo has, as explained later in more detail with reference to Fig. 2, a fluidised base. Fluidising air is supplied from blowers 12, via lines 13, to the fluidised bases of the silos, each line 13 containing a resistance valve 14 of the construction described later. As shown the silos are divided into two groups of four, the silos of each group being supplied with air from one of the blowers 12 and the lines 13 being connected in parallel to the blower.

Each silo is provided at the bottom with a variable speed rotary feeder 15. The rotary feeders 15 of each group of four silos discharge into a common discharge pipe 16 through which air is blown at high speed by a blower 17. The two discharge pipes 16 lead to a common cyclone blender 18.

Fig. 2 shows the fluidising chambers 31 at the base of one of the silos. These have perforated upper surfaces through which the air supplied by the line 13 flows to aerate the flour in the silo and facilitate downward flow of the flour to the rotary feeder 15. This is of known type and consists of a rotary pocket wheel 19, driven by a variable speed electric motor 20 and serving to discharge the flow into the discharge pipe 16.

The resistance valves 14 are provided for the following reason. When a single blower is utilised to supply air to the fluidising chambers of a number of silos, the air pressure developed by the blower is determined by the pressure required to aerate the silo containing the smallest quantity of flour. Accordingly, when one silo is nearly empty and others are nearly full, the blower may not be able to develop sufficient pressure to aerate the flour in the full silos. This disadvantage is obviated by the resistance valves 14 which provide a predetermined pressure drop in each of the lines 13 sufficient to ensure that the blower 12 can develop sufficient pressure, normally 5–6 p.s.i., to aerate a full silo notwithstanding the fact that it may be discharging air through an associated resistance valve into a silo which is nearly empty.

As shown in Fig. 3, the resistance valve 14 has a body 21 having an inlet 22 for connection to the portion of the line 13 leading from the blower 12 and an outlet 23 for connection to the portion of the line 13 leading to the fluidising chambers of the associated silo. Inside the valve body 21 is a piston 24, having at its upper end a threaded stem 28 which projects with clearance through a hole in a cap 25 screwed to the exterior of the valve body 21. A nut 26 and a lock nut 27 are screwed to the projecting end of the stem 28 and a spring 29, mounted in compression between the cap 25 and the piston 24, urges the piston 24 downwardly and causes the resistance valve to exert a back pressure on the blower, e.g. 5 p.s.i., determined by the loading of the spring 29. To adjust the valve to provide a higher back pressure, the cap 25 and a backing nut 30 are screwed down, thereby moving the piston 24 downwardly into the valve body 21. The nut 26 and lock nut 27 are then adjusted by a corresponding amount, to restore the undersurface of the piston 24 to its previous level, thereby increasing the loading of the spring 29.

What I claim as my invention and desire to secure by Letters Patent is:

1. Apparatus for blending different grades of flour or the like, comprising a plurality of silos, a variable speed rotary feeder at the lower end of each silo, each silo having a fluidized base for facilitating the flow of flour to said rotary feeder, air supply lines for supplying fluidizing air to the fluidized bases of said silos in parallel, a blower for supplying fluidizing air to all of said parallel air supply lines, a common air supply line connecting said blower to all of said parallel air supply lines, a resistance valve in each of said air supply lines situated between the common air supply line and the fluidized base supplied by said parallel air supply line and arranged to exert a predetermined back pressure on said blower, a common substantially horizontal discharge pipe for receiving the discharge from all of said rotary feeders, and a further blower for blowing a current of air at high speed through said discharge pipe.

2. Apparatus according to claim 1, wherein each resistance valve comprises a valve body having an air inlet at one end and a lateral air outlet, a piston mounted for movement in said casing and exposed at one end to the pressure of air at said air inlet, a compression spring loading the other end of said piston, said piston being movable in said valve body against said spring to open said outlet, and means for adjusting the loading of said spring.

3. Apparatus according to claim 2, wherein said piston has a threaded stem projecting from an opening in the end of the valve body remote from said air inlet and said adjusting means comprises a cap screwed to the valve body over said opening and having a hole for the passage of said threaded stem and a nut screwed to a portion of said threaded stem projecting from said cap.

References Cited in the file of this patent

UNITED STATES PATENTS

| 1,321,262 | Townsend | Nov. 11, 1919 |
| 1,649,062 | Halliburton | Nov. 15, 1927 |
| 2,527,455 | Schemm | Oct. 24, 1950 |
| 2,665,035 | Schemm | Jan. 5, 1954 |
| 2,681,748 | Weller | June 22, 1954 |

FOREIGN PATENTS

| 1,077,142 | France | Apr. 28, 1954 |
| 738,026 | Great Britain | Oct. 5, 1955 |